15
United States Patent Office 2,935,700
Patented May 3, 1960

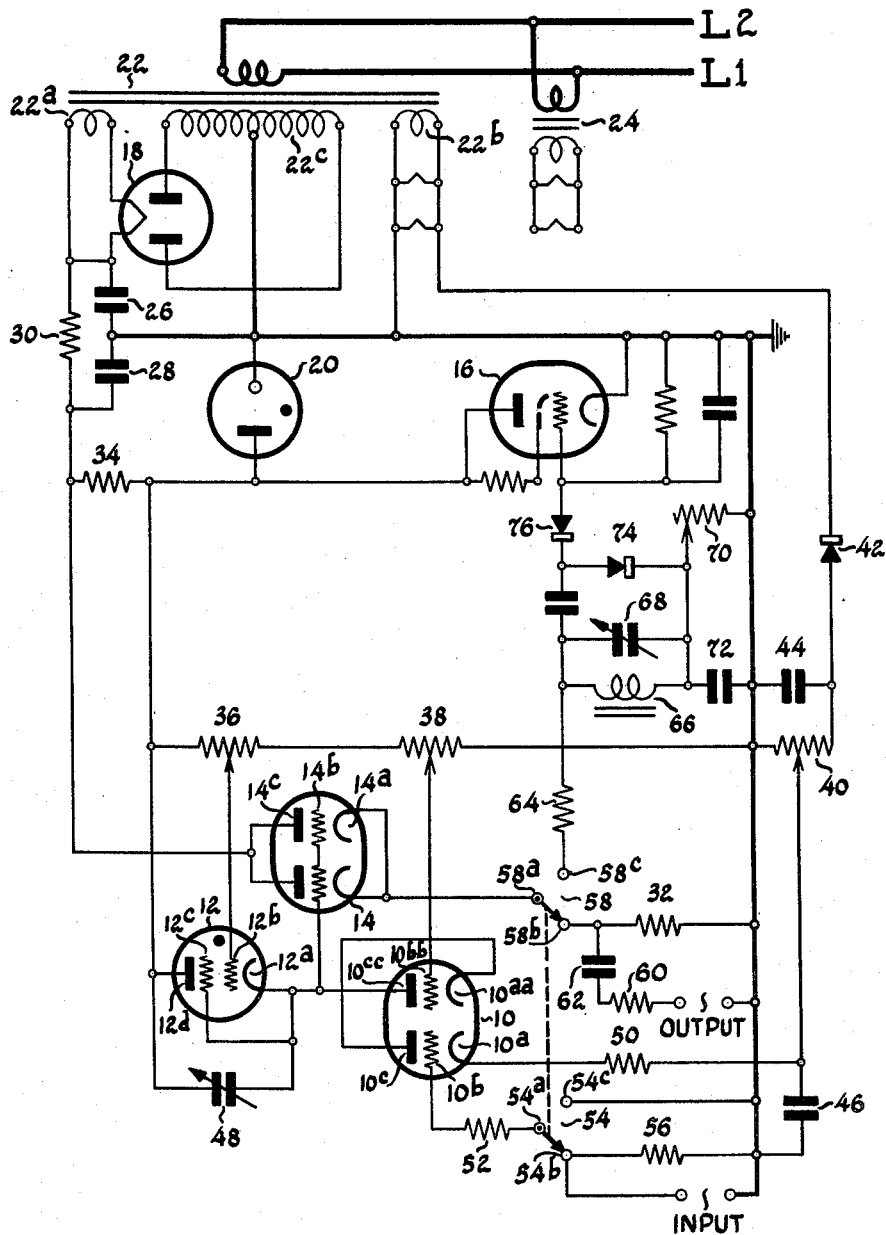

2,935,700
FREQUENCY MODULATION SYSTEMS

Walther Richter, Village of River Hills, Wis., assignor to Cutler-Hammer, Inc., Milwaukee, Wis., a corporation of Delaware Application August 1, 1955, Serial No. 525,420

9 Claims. (Cl. 332—16)

This invention relates to frequency modulation systems and it is an object of the invention to provide an improved system of this type.

Because direct writing oscillographs have a relatively low upper frequency limit and because photography is necessary in obtaining a permanent record of phenomena with the string oscillograph and cathode ray oscillograph, it has been physically and economically impossible to make permanent records of certain phenomena with these devices. For example, in record study of resistance welding where among thousands of good welds there may be only one bad one, the direct writing oscillograph is not satisfactory because of its frequency response limitations and the other devices are not satisfactory because miles of film may be used to obtain a few feet of film with a record of a bad weld.

The use of magnetic tape suggests itself because of the ease with which unwanted information may be erased. But magnetic tapes and wires have poor and variable low frequency response as well as varying amplitude response. Another object of the invention is to provide a frequency modulation system by which information, represented by variations too low in frequency for ordinary recording on magnetic tape or wire and too high in frequency for recording by direct writing oscillographs, may be recorded on magnetic tapes and wires and the like at a given tape speed in a form permitting re-recording of desired portions of said information with direct writing oscillographs at frequencies within the useful range of said oscillographs by merely reducing the tape speed.

These objects and certain other objects and advantages of the invention which will hereinafter appear, are realized in part by the provision of a novel frequency modulator in which the relationship of frequency deviation and signal magnitude is exceptionally linear and which provides large frequency deviations as a result of small changes in signal amplitude. And another object of the invention is to provide such a frequency modulator.

One embodiment of the invention is illustrated diagrammatically in the accompanying drawing. It is to be understood that various modifications may be made in the embodiment shown and that other embodiments are possible to be made without departing from the spirit of the invention or the scope of the appended claims.

Referring to the drawing, electron tubes 10 and 12 are connected in a frequency modulator, tube 14 is connected in a cathode follower, tube 16 is an indicating tube connected in a calibrating circuit for the frequency modulator and tubes 18 and 20 comprise a unidirectional power source.

The power supply

Alternating electrical power is supplied from a suitable source such as lines L1 and L2 to the primary windings of a power transformer 22 and a filament transformer 24. The latter supplies filament power to tubes 12 and 14. One filament winding $22^a$ of transformer 22 is connected to the filament of tube 18 and another filament winding $22^b$ supplies filament power to tubes 10 and 16.

The ends of the center-tapped high voltage secondary winding $22^c$ of transformer 22 are connected to the anodes of the full wave rectifier tube 18. The unidirectional output voltage appearing between the cathode of tube 18 and the center-tap of winding $22^c$ is filtered in a network comprising capacitors 26 and 28 and a resistor 30. The output of the filter network is applied to the series combination of tube 14 and its load resistor 32 and is also applied to a voltage regulator. The voltage regulator consists of a cold cathode gas tube 20 and a limiting resistor 34. The negative side of this supply source is connected to chassis ground.

Bias voltage for tube 12 and one section of tube 10 is provided by potentiometers 36 and 38 which are connected in series across regulator tube 20 to form a voltage divider. Bias voltage for the other section of tube 10 is impressed across part of a potentiometer 40 one end of which is grounded and which is connected in series with a half-wave rectifier 42 across the filament winding $22^b$. Capacitors 44 and 46 are connected across potentiometer 40 to form a filter network.

The frequency modulator

Tube 10 is shown as a dual triode comprising cathodes $10^a$ and $10^{aa}$, control electrodes $10^b$ and $10^{bb}$, and anodes $10^c$ and $10^{cc}$. It is to be understood that separate tubes may be employed in place of the dual triode. Tube 12 is a hot cathode gas tube and comprises a cathode $12^a$, a control electrode $12^b$, a shielding grid $12^c$ and an anode $12^d$.

Control electrodes $12^b$ and $10^{bb}$ are connected to the taps of potentiometers 36 and 38, respectively. Cathode $12^a$ is connected to grid $12^c$, to anode $10^{cc}$ and through an adjustable capacitor 48 to anode $12^d$ and the positive terminal of voltage regulator tube 20. Cathode $10^{aa}$ is connected to anode $10^c$ and cathode $10^a$ is connected through a resistor 50 to the tap of potentiometer 40. Thus the two sections of tube 10 are connected in cascode in series with tube 12.

Control electrode $10^b$ is connected to ground through resistor 52, terminals $54^a$ and $54^b$ of switch 54 and a resistor 56. An electrical signal whose magnitude represents instantaneous information values is applied at the input terminals across resistor 56.

Charging current for capacitor 48 flows in the circuit traced from the positive terminal of the regulated voltage source (across regulator tube 20), through capacitor 48, through tube 10 from anode $10^{cc}$ to cathode $10^{aa}$ to anode $10^c$ to cathode $10^a$, through resistor 50 and thence from the tap of potentiometer 40 to ground. As the capacitor charges, a larger percentage of the supply voltage is impressed across it. Thus the potential of anode $10^{cc}$ and cathode $12^a$ becomes less positive. The potential of control element $12^b$ remains fixed at a potential determined by the setting of the tap of potentiometer 36. As the potential of capacitor 48 increases, the potential difference between cathode $12^a$ and control element $12^b$ decreases and finally a point will be reached at which tube 12 will fire to discharge capacitor 48 to a voltage value equal to the arc drop of tube 12 and return said potentials to substantially their original values. Thereafter the cycle is repeated.

If the cascode connected sections of tube 10 were omitted from the charging circuit of capacitor 48, the voltage drop across the latter would increase exponentially with time as said capacitor 48 was charged by current flow through the resistive charging circuit. Inclusion of the cascode circuit insures a linear increase with time of the voltage drop across this capacitor because it acts as a constant current source. The magnitude of current flow to capacitor 48 is independent of the voltage at the anode 10cc of tube 10, but for a given set of circuit elements, is proportional to the control electrode 10b—cathode 10a voltage or the Input voltage. The resistor 50 applies a negative feedback to the first section of tube 10 and, because no screen current flows to reduce effectiveness of the negative feedback, more linear current characteristics are exhibited than can be obtained using a pentode tube. If Input voltage is doubled, current flow to capacitor 48 is doubled, the firing potential of tube 12 is reached in half the time and the frequency of the voltage variations at anode 10cc is doubled.

In a typical application the components of the circuit are selected and potentiometers 36, 38 and 40 are adjusted so that capacitor 48 is charged and discharged at a center frequency of five thousand times per second when the Input signal magnitude is zero and so that this frequency is changed to seven thousand and three thousand times per second at signal magnitudes of plus four volts and minus four volts, respectively.

The output signal of the frequency modulator is a saw-tooth wave of constant peak amplitude whose frequency varies in accordance with Input signal magnitude. The output signal is taken between ground and anode 10cc of tube 10.

The cathode follower

Control electrode 14b of tube 14 is connected to the anode 10cc of tube 10. Tube 14 is a dual section triode and the sections are connected in parallel. The parallel cathodes, control electrodes, and anodes are designated 14a, 14b and 14c, respectively. The anodes 14c are connected to the positive side of the power supply. The cathodes are connected to the ground or negative side through terminals 58a and 58b of switch 58 and resistor 32. The Output terminals are connected across resistor 32 through the series combination of a limiting resistor 60 and a coupling capacitor 62.

The Output terminals may be connected to suitable amplifiers or may be connected directly to a magnetic recorder. In the case of the example previously selected, the recorded wave would have a constant peak amplitude and would vary in frequency from three thousand to seven thousand cycles per second. The amplitude response characteristic of the tape does not affect the accuracy with which the information is recorded. By playing the tape back at reduced speed through a suitable demodulator, the original amplitude variations can be reproduced and recorded by a direct writing recorder at the frequencies at which the recorder is most accurate.

The calibrating circuit

To insure that the frequency modulator operates at the proper center frequency when the signal input is zero, provision is made for substituting a tuned circuit for the load resistor 32 in the cathode follower.

When switches 54 and 58 are operated to connect terminals 54a and 54c and terminals 58a and 58c, the control electrode 10b of tube 10 is connected to ground so that zero signal is applied to the modulator. Cathodes 14a of tube 14 are connected to ground through the series combination of a resistor 64, a parallel tuned circuit comprising an inductor 66 and a capacitor 68, and a parallel cathode bias circuit comprising rheostat 70 and capacitor 72.

The circuit 66—68 is tuned to the frequency at which the modulator should operate when input signal amplitude is zero. When the modulator is operating at that frequency, maximum voltage will appear across the tuned circuit. While the modulator frequency may be adjusted by adjustment of any of the elements that affect its frequency, it is considered preferable to adjust the capacitance of capacitor 48 and the setting of potentiometer 40. These are adjusted until the voltage across inductor 66 and capacitor 68 is maximum.

The voltage may be measured as desired. In the drawing, it is measured with a tuning eye indicating tube 16 which is connected to the tuned circuit by a rectifier-voltage doubler circuit comprising rectifiers 74 and 76.

I claim:

1. A frequency modulation system comprising, in combination, a unidirectional electrical power source, first and second triode electron tubes connected in cascode in series with a thyratron electrode tube in that order between a negative and a positive point in said source, said cascode connection comprising control means connecting the cathode of said first electron tube to said negative point in said source, the anode of said first electron tube being connected to the cathode of said second electron tube and the anode of said second electron tube being connected to said thyratron electron tube, means for applying a bias voltage to the control electrode of said second electron tube, circuit means for applying an electrical signal between the control electrode of said first electron tube and said negative point in said source, a capacitor connected between the cathode and anode of said thyratron electron tube, and a cathode follower comprising an electron tube having an anode connected to a positive point in said source and further having a cathode connected to an output circuit and a control electrode connected to the junction between the anode of said second electron tube and said thyratron electron tube.

2. A frequency modulation system comprising, in combination, a unidirectional electrical power source, a frequency modulator, a cathode follower and a resonant calibrating circuit, said frequency modulator comprising first and second triode electron tubes connected in cascode and a thyratron type electron tube connected in series with said cascode connected triodes in that order between a negative point and a positive point in said source, said cascode connection comprising means connecting the cathode of said first electron tube to said negative point in said source, the anode of said first electron tube being connected to the cathode of said second electron tube and the anode of the latter being connected to said thyratron electron tube, means for applying a bias potential to the control electrode of said second electron tube, means for applying a control signal to the control electrode of said first electron tube, a capacitor connected in parallel with said thyratron electron tube, said cathode follower comprising an electron tube having an anode connected to a positive point in said source and a control electrode connected to the junction of said second electron tube and said thyratron electron tube and further comprising a cathode connected through an output circuit to a negative point in said source, means for selectively disconnecting said cathode of said cathode follower electron tube from the output circuit and for connecting the same to said resonant calibrating circuit, said resonant calibrating circuit comprising a resonant circuit tuned to the frequency at which said modulator is desired to operate when said control signal is of zero value and means connected thereto for detecting when a voltage of resonant frequency is applied to said tuned circuit, and means for varying at least one of the firing potential of said thyratron electron tube or the conductivity through said first and second cascode connected tubes or the capacitance of said capacitor.

3. In a frequency modulator, an alternating current supply source, rectifier means and voltage regulator means for deriving a regulated unidirectional voltage from said supply source, relaxation oscillator means comprising cascode-connected first and second electric discharge devices and a third electric discharge device connected to said second electric discharge device, said cascode connection comprising control means connecting the cathode of said first discharge device to one side of said unidirectional voltage, the anode of said first discharge device being connected to the cathode of said second discharge device and the anode of the latter being connected through said third discharge device to the other side of said unidirectional voltage, means for applying bias voltages to the control electrodes of said second and third discharge devices, said third discharge device having capacitor means connected across the main electrodes thereof for controlling its discharge, means for applying an input signal to the control electrode of said first discharge device to control periodic charging of said capacitor means by current flow through said first and second electric discharge devices and discharging the same through said third discharge device, means for deriving an output signal from the junction of said second and third discharge devices, said output signal being frequency modulated in accordance with the amplitude variation in said input signal, and means included in said control means in the cascode connection for applying negative feedback to said first discharge device to enhance the linearity and stability of the relation between the input signal and the anode current of said second discharge device.

4. The invention defined in claim 3, wherein said means for applying negative feedback comprises a resistor of relatively large value connected between the cathode of said first discharge device and said one side of said unidirectional voltage.

5. The invention defined in claim 4, wherein said means for applying bias voltages comprises a voltage divider connected across said unidirectional voltage, means for connecting a voltage from said divider to bias the control electrode of said second discharge device with a voltage intermediate the positive and negative sides of the output of said voltage regulator means, and means for connecting a voltage from said divider to bias the control electrode of said third discharge device with a voltage intermediate the bias voltage of said second discharge device and the positive side of said voltage regulator means.

6. The invention defined in claim 3, wherein said means for deriving said output signal comprises cathode follower electric discharge means supplied from the unidirectional output voltage of said voltage regulator means and having an input control electrode connected to said junction, the load utilizing said output signal being connectable in circuit between said cathode follower means and said one side of said unidirectional voltage.

7. The invention defined in claim 3, together with calibrating means for said oscillator for preselecting the no-input-signal frequency thereof, and switching means for selectively connecting said output signal to said calibrating means and for disconnecting said input signal, said calibrating means comprising means for adjusting the no-input-signal frequency of said oscillator to a desired value.

8. In a frequency modulator, in combination, a unidirectional electrical power source, constant current conducting means comprising first and second electric discharge devices, means connecting the cathode of said first discharge device to one side of said source, the anode of said first discharge device being connected to the cathode of said second discharge device and the anode of the latter being connected to an output junction, a third electric discharge device having its main electrodes connected between said output junction and the other side of said source whereby the three discharge devices are connected in serial relation across said source, an electrical energy storage device connected across the main electrodes of said third discharge device, means for controlling said discharge devices to cause current flow through said first and second discharge devices to effect alternate storage of energy in said energy storage device and discharge of energy therefrom through said third discharge device to provide an alternating voltage at said output junction, means for adjusting said controlling means or said energy storage device or both to preset the no-input-control-voltage frequency of said alternating voltage to a desired value, means for applying an adjustable and reversible input control voltage to the control electrode of said first discharge device to cause changes in the current flow through said first and second discharge devices to said energy storage device in proportion to and in a direction determined by the magnitude and polarity of said input control voltage, and means for deriving an output voltage from said junction having a frequency modulated in proportion to the variations in said input control voltage.

9. The invention defined in claim 8, wherein said first and second discharge devices are triode electron tubes, and said means connecting the cathode of said first discharge device to one side of said source comprises a resistor for affording negative feedback to said first discharge device thereby to enhance the linearity of the current characteristic of the modulator.

References Cited in the file of this patent

UNITED STATES PATENTS

| | | |
|---|---|---|
| 2,027,195 | Parkin et al. | Jan. 7, 1936 |
| 2,321,269 | Artzt | June 8, 1943 |
| 2,355,287 | Firestone | Aug. 8, 1944 |
| 2,453,787 | Downs | Nov. 16, 1948 |
| 2,605,430 | Marcy | July 29, 1952 |
| 2,691,101 | Casey | Oct. 5, 1954 |